US008267118B2

(12) United States Patent
Leutwyler

(10) Patent No.: US 8,267,118 B2
(45) Date of Patent: Sep. 18, 2012

(54) SANITARY FITTING WITH A DISPLACEABLY MOUNTED ACTUATING LEVER

(75) Inventor: Andre Leutwyler, Menziken (CH)

(73) Assignee: KWC AG, Unterkulm (CH)

( * ) Notice: Subject to any disclaimer, the term of this patent is extended or adjusted under 35 U.S.C. 154(b) by 219 days.

(21) Appl. No.: 12/881,682

(22) Filed: Sep. 14, 2010

(65) Prior Publication Data

US 2011/0089355 A1   Apr. 21, 2011

(30) Foreign Application Priority Data

Oct. 20, 2009   (EP) .................................... 09013192

(51) Int. Cl.
*F16K 11/18*   (2006.01)

(52) U.S. Cl. ............. 137/625.17; 137/625.4; 137/636.3; 137/636.4

(58) Field of Classification Search ............. 137/625.17, 137/625.4, 636.3, 636.4
See application file for complete search history.

(56) References Cited

U.S. PATENT DOCUMENTS

| | | | | |
|---|---|---|---|---|
| 2,959,183 A | * | 11/1960 | Jordan | 137/636.4 |
| 3,080,570 A | * | 3/1963 | Weddendorf, Jr. | 137/636.4 |
| 3,105,519 A | * | 10/1963 | Fraser | 137/625.17 |
| 3,169,549 A | * | 2/1965 | Quick | 137/625.17 |
| 3,286,720 A | * | 11/1966 | Mongerson | 137/636.4 |
| 3,421,540 A | * | 1/1969 | Fulton et al. | 137/636.4 |
| 3,532,123 A | * | 10/1970 | Anthony | 137/636.3 |
| 3,537,479 A | * | 11/1970 | Nelson | 137/636.4 |
| 4,328,830 A | * | 5/1982 | Greer | 137/625.4 |
| 5,144,981 A | | 9/1992 | Bergmann | |
| 5,358,213 A | * | 10/1994 | Pilolla | 137/625.17 |
| 5,522,429 A | | 6/1996 | Bechte et al. | |
| 7,314,063 B2 | * | 1/2008 | Egli | 137/636.3 |
| 2009/0256096 A1 | | 10/2009 | Graber | |
| 2011/0000564 A1 | * | 1/2011 | Corbin et al. | 137/625.4 |

FOREIGN PATENT DOCUMENTS

| | | |
|---|---|---|
| DE | 33 27 776 A1 | 2/1985 |
| DE | 38 38 765 A1 | 5/1990 |
| DE | 93 12 826 U1 | 2/1995 |
| DE | 44 43 123 A1 | 6/1996 |
| EP | 0 426 587 A1 | 5/1991 |
| EP | 0 426 639 A1 | 5/1991 |

OTHER PUBLICATIONS

Co-pending U.S. Appl. No. 12/385,606, filed Apr. 14, 2009.
European Patent Office, European Search Report for EP 09 01 3192 (with English-language translation), Mar. 10, 2010, pp. 1-3 (pp. 1-2 for translation).
Oct. 19, 2011 Office Action issued in U.S. Appl. No. 12/385,606.

* cited by examiner

*Primary Examiner* — John Rivell
(74) *Attorney, Agent, or Firm* — Oliff & Berridge, PLC

(57) ABSTRACT

The present invention relates to a sanitary fitting having a fitting house and having a control cartridge which is arranged in the latter. The control cartridge has a control shank which is pivotably mounted in the control cartridge. On the control shank is displaceably mounted an actuating lever which can be pivoted up and down between a closed position and an open position in order thus to control the water flow. Furthermore, a plate is mounted at one end on the guide element and at the other end on an axis of rotation which is fixedly arranged with respect to the pivot axis and which is parallel thereto. By means of this arrangement, during the pivoting of the actuating lever from the closed position in the direction toward the open position, said actuating lever is also moved in the direction away from the control shank and, in the direction of the cartridge axis, away from the fitting housing.

9 Claims, 6 Drawing Sheets

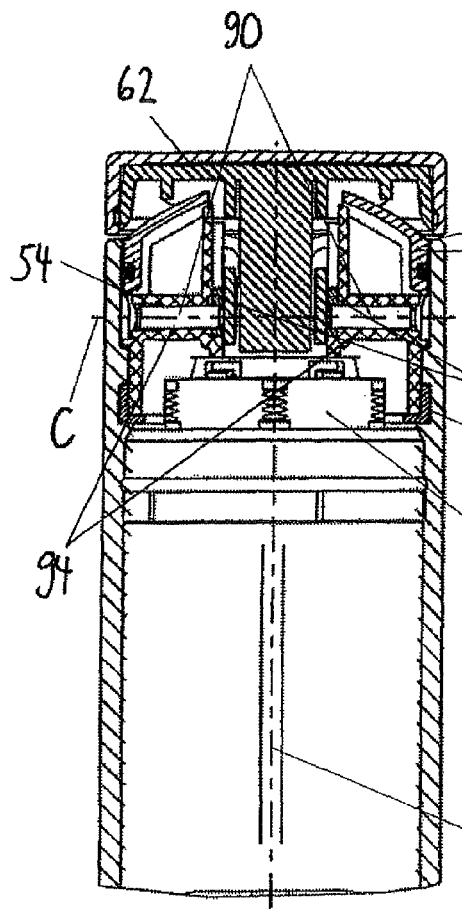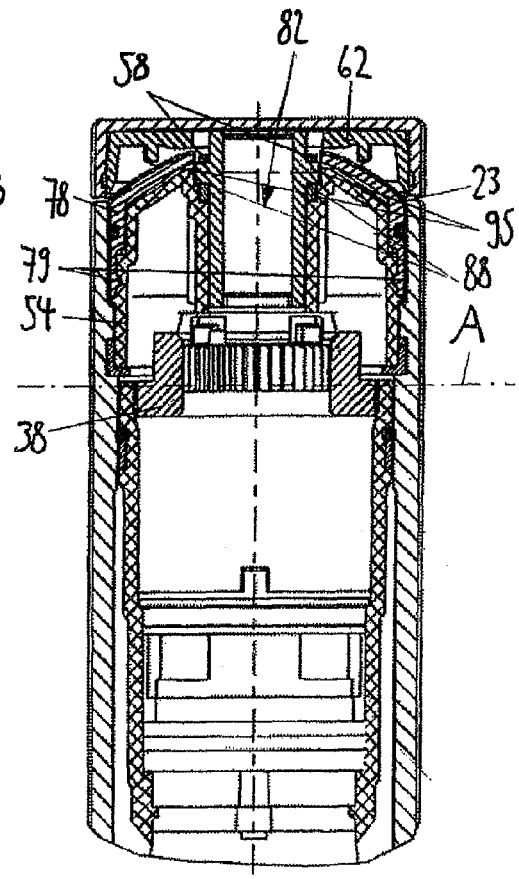
Fig. 5
Fig. 6
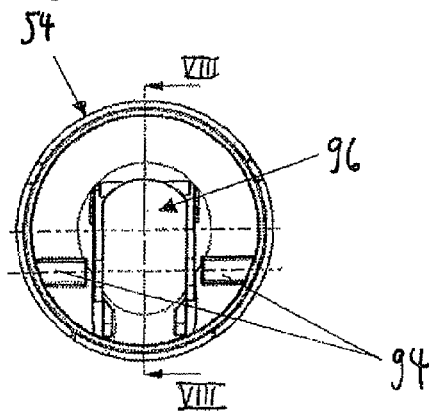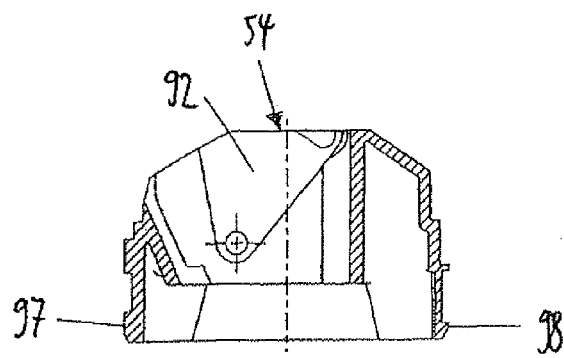
Fig. 7
Fig. 8

SANITARY FITTING WITH A DISPLACEABLY MOUNTED ACTUATING LEVER

The present invention relates to a sanitary fitting as claimed in patent claim 1.

In the case of known sanitary fittings, the actuating lever is fixedly arranged on the control shank of a control cartridge. The control cartridge is accommodated in a fitting housing. The water flowing through the fitting housing is controlled by pivoting the actuating lever up and down. Here, a conflict can arise between the actuating lever and the fitting housing. In order to rule this out, it is necessary with certain forms of fitting housing and actuating lever to arrange cutouts on the fitting housing and/or on the actuating lever. This is not very esthetic and makes it easier for dirt and water to enter the fitting housing.

A sanitary fitting which no longer has this disadvantage is disclosed in the earlier patent application EP 08 007 342.2. The construction disclosed in this patent application shows an actuating lever whose lever axis is guided in a slot. During the pivoting of the actuating lever from the closed position into the open position, a conflict between the fitting housing and the actuating lever is prevented in that the slot correspondingly controls the spacing of the actuating lever from the housing.

It is an object of the present invention to provide a sanitary fitting whose construction is simple and prevents a conflict between the fitting housing and the actuating lever.

This object is achieved by a sanitary fitting which has the features of patent claim 1.

By displaceably mounting a guide element of the actuating lever on the control shank and by means of a plate, a conflict between the actuating lever and the fitting housing is avoided when pivoting the actuating lever up and down. Here, the plate is mounted at one end on the guide element and at the other end on an axis of rotation which is fixedly arranged with respect to a pivot axis of the control shank and which is parallel thereto. Furthermore, the plate moves the actuating lever, during its movement from a closed position in the direction toward an open position, away from the control shank and, as seen in the direction of a cartridge axis, away from the fitting housing.

A preferred embodiment of the sanitary fitting according to the invention is defined in patent claim 2. In the closed position, the longitudinal direction of the plate forms, as seen in a view in the direction of the pivot axis, an acute angle with the cartridge axis. Furthermore, the axis of rotation, with respect to the cartridge axis, is arranged on a side opposed to the operator-side end.

A particularly simple embodiment of the sanitary fitting according to the invention is indicated in patent claim 3.

A further preferred embodiment is defined in patent claim 4. Here, a mounting element is arranged on the fitting housing, preferably such that it can be rotated about the cartridge axis. The axis of rotation of the plate is defined by the mounting element. This leads to a simple structure and makes it possible in a simple manner to rotate the control shank about the cartridge axis, for example to set a mixed water temperature.

A further particularly preferred embodiment is defined in patent claim 7. In the case of such an embodiment, with the plate oriented parallel to the cartridge axis, the actuating lever has, as seen in the direction of the cartridge axis, the largest spacing from the fitting housing.

Further preferred embodiments of the sanitary fitting according to the invention are indicated in the remaining dependent patent claims.

The invention will be explained with reference to an exemplary embodiment represented in the drawing, in which, purely schematically:

FIG. 5 shows, in a cross section along the line V-V from FIG. 3 through an axis of rotation of the plates, part of the sanitary fitting with the actuating lever in the closed position;

FIG. 6 shows, in a cross section along VI-VI through upper stub bolts of the plates, part of the sanitary fitting with the actuating lever in the closed position;

FIG. 7 shows a plan view of a mounting element;

FIG. 8 shows the mounting element in a longitudinal section along the line VIII-VIII from FIG. 7;

Figure 1:
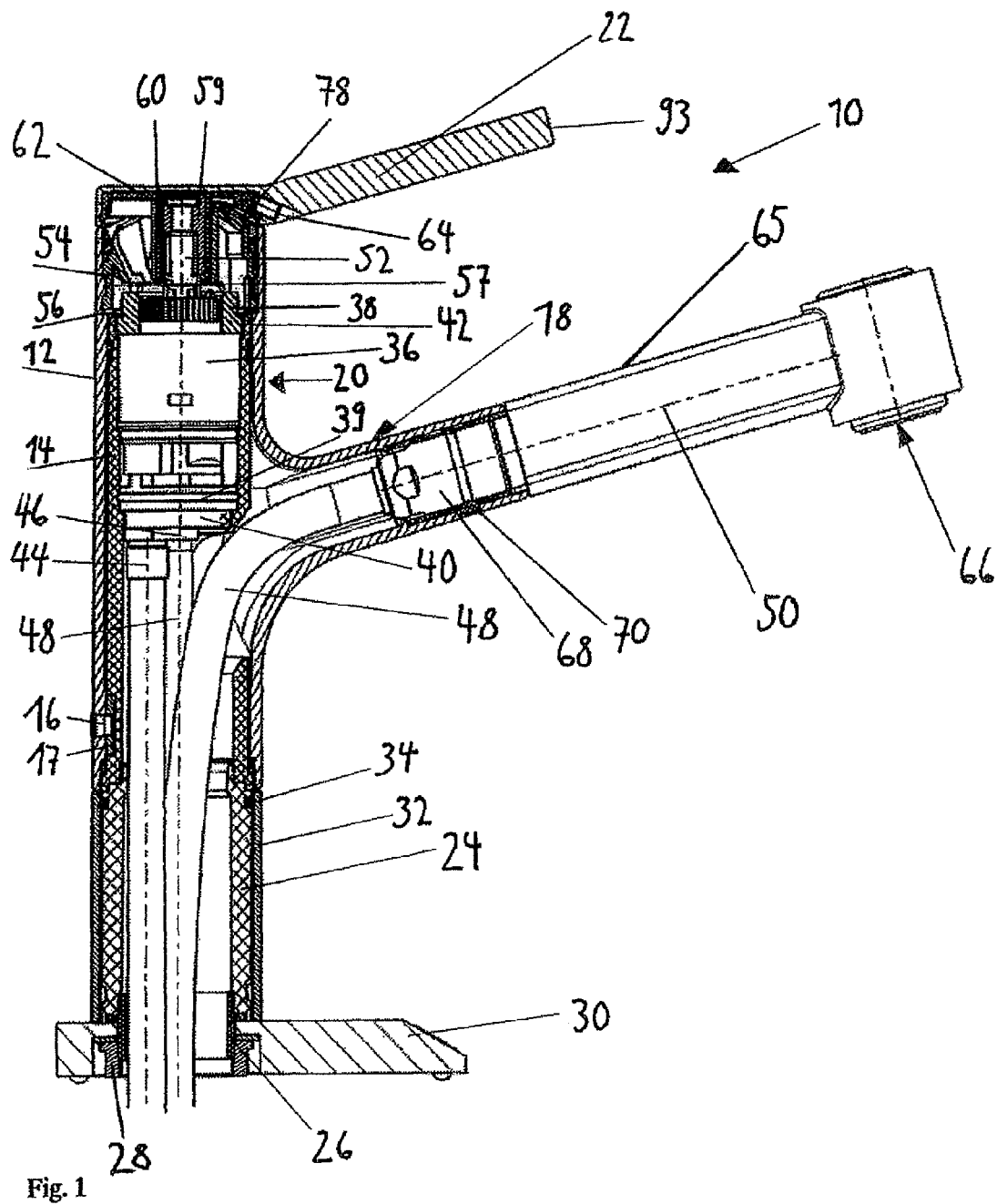
FIG. 1 shows, in a central longitudinal section, a sanitary fitting according to the invention with an extendable shower.

FIG. 1 shows a vertical longitudinal section through a sanitary fitting 10 according to the invention. The sanitary fitting 10 has a fitting housing 12 and an inner housing 14 arranged therein. The fitting housing is hollow cylinder-shaped and held in the axial direction on the inner housing 14 by means of a locking screw 16, which is screwed into the fitting housing 12, and a guide element 17 which has a guide slot extending in the circumferential direction and into which the locking screw 16 engages, and the fitting housing is rotatably mounted in the direction of the cartridge axis B. An outlet extension 18 is arranged in one piece on the fitting housing 12. The fitting housing 12 has an outer lateral surface 20 which in the present case is circular cylinder-shaped. In a closed position, an actuating lever 22 is arranged immediately adjoining the circular cylinder-shaped, outer lateral surface 20, with the formation of a gap 23 which runs round in the circumferential direction. The circumferential gap 23 has a constant width over the entire circumference. Preferably, this width is very narrow, therefore less than 1 mm, particularly preferably less than 0.5 mm.

The inner housing 14 is screwed onto a sleeve-shaped base inner housing 24 which is fastened in a known manner to a washstand 30 by means of a sleeve 26 and a corresponding clamping nut 28. The base inner housing 24 is enclosed by a base outer housing 32 which is held on the base inner housing 24 via an O-ring seal 34.

Here, a type of frictional connection is formed between the base inner housing 24 and the base outer housing 32. The O-ring seal 34 is arranged in the upper region of the base inner housing 24 and prevents dirt and water from entering the sanitary fitting.

The base outer housing 32 and the fitting housing 12 are preferably produced from metal, while the inner housing 14 and the base inner housing 24 are preferably produced from plastic.

A general known control cartridge 36, which serves to control the water flow through the sanitary fitting, is fixedly arranged in the inner housing 14 by means of a locking nut 38. Here, the control cartridge 36 is supported, by way of its seals 39 at the bottom, on an intermediate base 40 of the inner housing 14. In an upper region facing the actuating lever 22, the locking nut 38 engages in an internal thread 42 of the inner housing 14 and thus clamps the control cartridge 36 onto the intermediate base 40. On this intermediate base 40 are formed through-passages for connections 44 for cold and hot water and for an outflow 46 for the mixed water. The mixed water is fed by means of a hose 48 to an extendable shower 50.

The control cartridge 36 has, in a known manner, a control shank 52 which can be pivoted about a pivot axis A which intersects a cartridge axis B at a right angle, which cartridge axis is defined by the control cartridge 36. The cartridge axis B is coincident with the axis of the sanitary fitting 10. The control shank 52 interacts with the actuating lever 22, specifically in such a way that, through pivoting about the pivot axis A, the water flow and, through rotation about the cartridge axis B, the temperature can be determined in a known manner.

The control shank 52 engages through a mounting element 54 which is mounted on the fitting housing 12 such that it can be rotated about the cartridge axis B by means of an, in this case open, L-ring 56. The L-ring 56 is formed as a clamping ring and held in the axial direction by a bead 57 formed in the fitting housing 12. The mounting element 54 serves for mounting at least one plate 58, in the present case a pair of plates. The actuating lever 22 can be pivoted up from a closed position, as shown in FIG. 1, into an open position, cf. FIGS. 13 and 14, and be pivoted down again from this open position into a closed position. In the exemplary embodiment shown, in the closed position, the longitudinal direction of the control shank 52 extends in the direction of the cartridge axis B and, when pivoting the actuating lever 52 from the closed position in the direction toward the open position, an opening angle α forms, cf. FIG. 13.

A sliding element 59 is fastened to the control shank 52 and a guide element is displaceably mounted on said sliding element, in the longitudinal direction of the control shank 52. The guide element 60 is formed with a cap-shaped actuating lever insert 62 and the latter is immovably and fixedly connected to the actuating lever 22. It is also conceivable to form the guide element 60 as a separate element and to fasten it to the actuating lever 22 or to the cap-shaped actuating lever insert 62, or to form the guide element 60, the actuating lever 22 and the actuating lever insert 62 integrally. The guide element 60 is hollow cylinder-shaped, engages through the mounting element 54, and the outer cross section of the sliding element 59 corresponds to the inner cross section of the guide element 60.

The actuating lever 22 is fastened to the actuating lever insert 62 by means of a locking screw 64, preferably a grub screw.

The shower 50 has a handle 65 which bears a shower head 66 at one end and a connection piece 68 at the other end. The connection piece 68 can be lowered in the outlet extension 18 of the fitting housing 12. The hose 48, which carries the mixed water, is fastened to said connection piece. This arrangement makes it possible to pull the shower 50 out of the outlet extension 18; this shower is thus an extendable shower. To avoid water and dirt entering between the outlet extension 18 and the connection piece 68, a sealing element 70 is arranged on the inner side of the outlet extension 18. Said sealing element further serves to hold the shower 50 extendably in the outlet extension 18 by means of a type of frictional connection.

Figure 2:
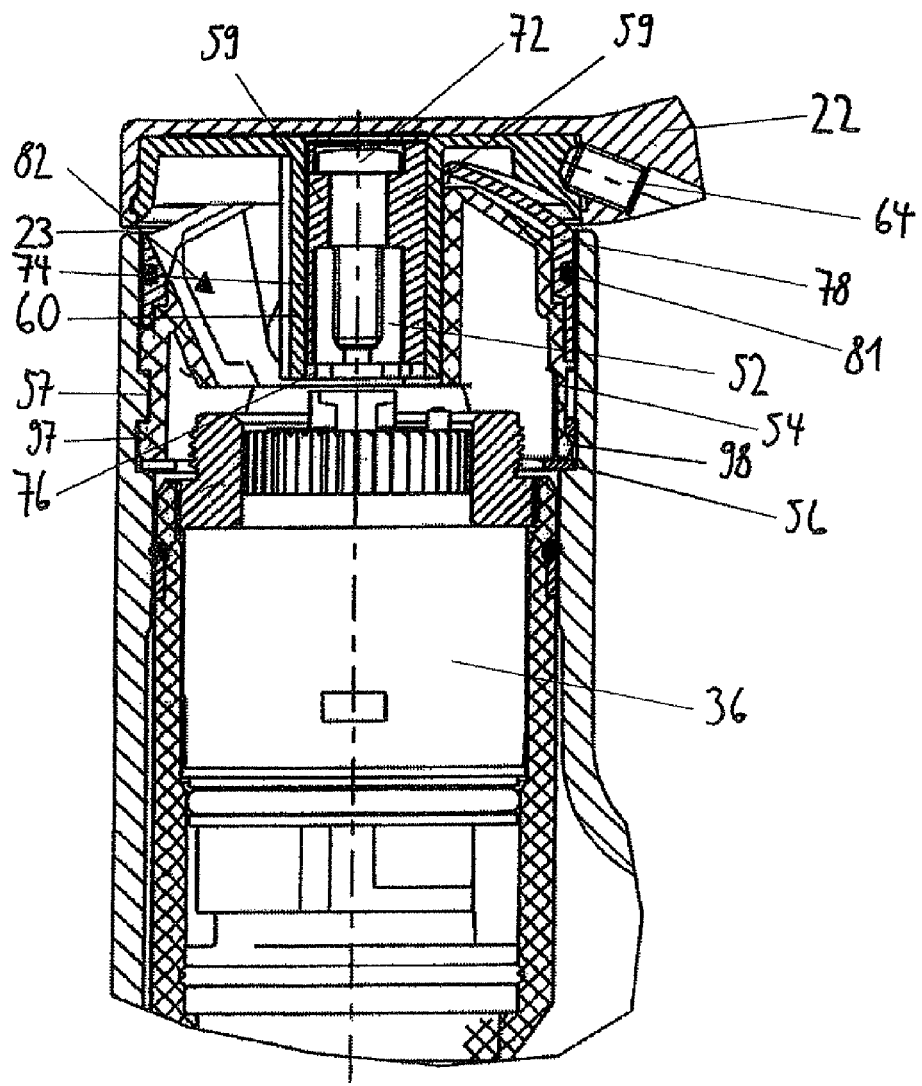
FIG. 2 shows, in a central longitudinal section along the line II-II from FIG. 3 through a control shank, part of the sanitary fitting, with the actuating lever being situated in a closed position.
Figure 3:
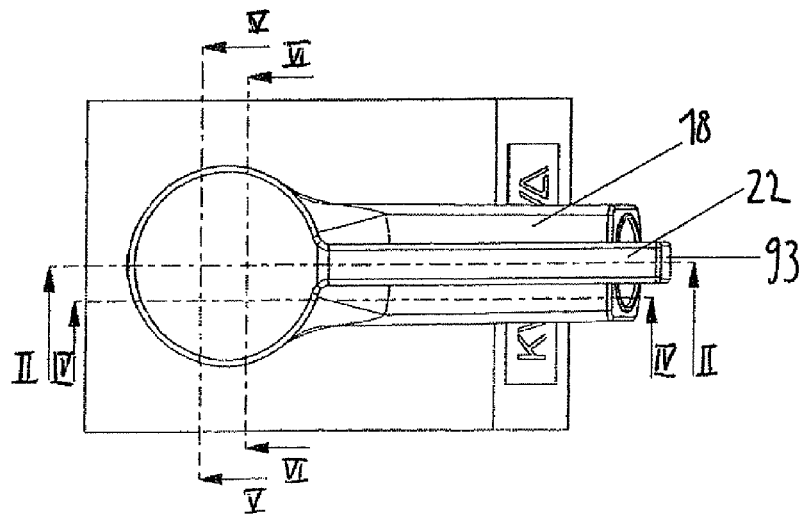
FIG. 3 shows a plan view of the sanitary fitting with the actuating lever likewise in the closed position.

FIG. 2 shows a longitudinal section along the line II-II from FIG. 3 through the upper region of the sanitary fitting 10 opposed to the washstand 30. In FIG. 2, the actuating lever 22 is in the closed position and the longitudinal axis of the control shank 52 is oriented parallel to the cartridge axis B. The sliding element 59 is fastened to the control shank 52 by means of a screw 72. This sliding element 59 engages in the guide element 60. By means of a groove 74 in the sliding element 59 and a rib 76 on the guide element 60, the sliding element 59 is mounted against rotation in the guide element 60. Adjoining the upper end of the inner housing 14, which lies in the region of the locking nut 38, the L-ring 56 is arranged on the fitting housing 12 and serves for axially mounting the mounting element 54 on the fitting housing 12.

A cap 78 is placed in a rotationally fixed manner on the mounting element 54 by means of a snap connection. This cap 78 thus rotates together with the mounting element 54. The snap connection is produced via tongues 79 on the cap 78 which engage in complementarily formed grooves 80 on the mounting element 54, see also FIGS. 6 and 9. Between the cap 78 and the fitting housing 12 is arranged a grooved ring seal 81 which prevents dirt and water from entering the fitting housing 12. The cap 78 covers the mounting element 54 completely, with the exception of a through-passage 82 through which the guide element 60 or the sliding element 59 engages. This through-passage 82 is designed to be only slightly wider than the guide element 60 and thus protects the inner region of the sanitary fitting 10 from the ingress of dirt and water when the actuating lever 22 is not in the closed position. Further-more, the through-passage 82 in the cap 78 allows the actuating lever 22 to pivot from the closed position into the open position.

FIG. 3 shows a plan view of the sanitary fitting 10 in the closed position, therefore at an opening angle of 0°. FIG. 3 depicts the various section lines which relate to FIGS. 2, 4, 5 and 6. FIG. 3 shows the actuating lever 22 and the outlet extension 18 of the fitting housing 12 without the shower 50.

Figure 4:
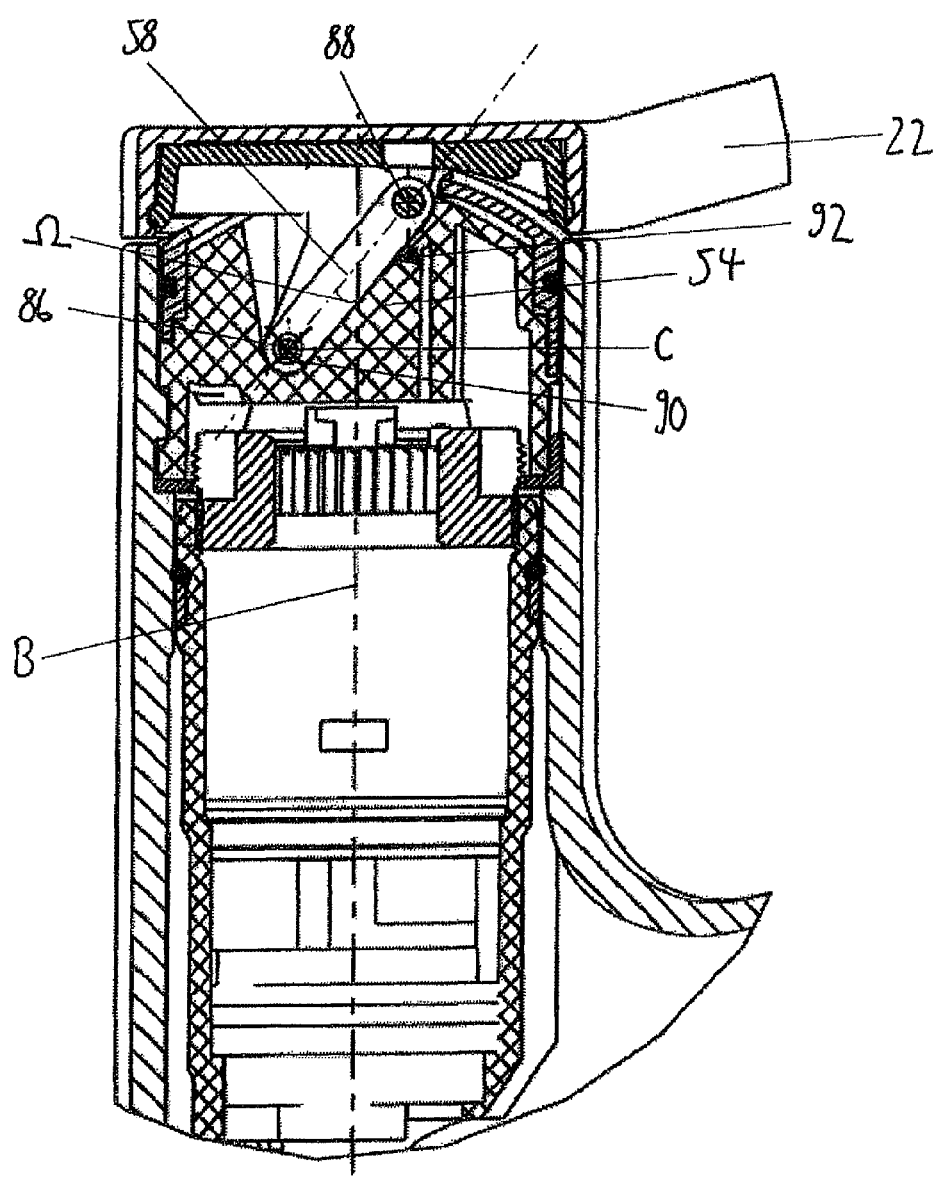
FIG. 4 shows, in a laterally offset longitudinal section along the line IV-IV from FIG. 3, in the case of a plate, part of the sanitary fitting, with the actuating lever being situated in the closed position as in FIGS. 2 and 3.

FIG. 4 shows a longitudinal section along the line IV-IV from FIG. 3. The plate 58, which is mounted at one end on the guide element 60 and at the other end on an axis of rotation C which is fixedly arranged with respect to the pivot axis and which is parallel thereto, serves to move the actuating lever 22, when pivoting from the closed position in the direction toward the open position, in the direction away from the control shank 52 and, as seen in the direction of the cartridge axis B, away from the fitting housing 12. The axis of rotation C, which extends through a lower articulation 86 facing the control cartridge 36, is arranged on the mounting element 54 and is defined by the latter. An upper articulation 88 facing the actuating lever 22 and opposed to the control cartridge is arranged on the guide element 60. The lower articulation 86 is formed by a mounting pin 90 on which the plate 58 is pivotably mounted. The freedom of movement of the plate 58 is delimited by recesses 92 in the mounting element 54, specifically in such a way that the plate 58, or the actuating lever 22, cannot be pivoted beyond a maximum open position or an opening angle of in this case 25° and cannot be pivoted down beyond the closed position or an opening angle of 0° in the direction of the outlet extension 18. In the closed position of the actuating lever 22, the plate 58, as seen in a view in the direction of the pivot axis A, forms with its longitudinal direction an acute angle Ω with the cartridge axis B. Furthermore, the axis of rotation C of the lower articulation 86 of the plate 58 lies, with respect to the cartridge axis B, on a side opposed to an operator-side end 93 of the actuating lever 22, see also FIG. 1. For this purpose, cutouts 94 through which the mounting pin 90 is guided are situated in the mounting element 54, specifically on the side of the actuating lever 22 opposed to the operator-side end. The mounting pin 90 extends coaxially to the axis of rotation C and is arranged on the mounting element 54. This is shown in FIGS. 5, 7 and 8.

Preferably, as in the present exemplary embodiment, two plates 58 are arranged laterally on the guide element 60, one on each side, and correspondingly two mounting pins 90 are arranged on the mounting element 54. Here, the plates 58 can move in a respective plane parallel to a movement plane of the control shank 52. The section shown in FIG. 4 extends only through one of the plates 58. By contrast, in FIGS. 5 and 6, both plates are shown.

FIG. 5 shows a section along the line V-V from FIG. 3 through the sanitary fitting 10 situated in the closed position. Here, the sanitary fitting 10 is sectioned through the lower articulation 86, therefore through the axis of rotation C of the plates 58. The mounting pins 90, which receive the plates 58, extend from a radially outer end of the mounting element 54 to the lower articulation 86 of the plates 58. The movement of the plates 58 in the lateral direction, therefore in the direction of the axis of rotation C, is prevented by means of the mounting element 54 and the actuating lever insert 62. The cutouts 94 in the mounting element 54 are likewise shown in FIG. 5. The rotatable mounting of the mounting element 54 by means of the L-ring 56 can be clearly seen in this view. The control cartridge 36 is shown in a side view and not in section.

FIG. 6 shows a section along the line VI-VI from FIG. 3 through the sanitary fitting 10 situated in the closed position. Here, the sanitary fitting 10 is shown in section through the upper articulation 88, through stub bolts 95 of the guide element 60 on which the plates 58 are pivotably fastened. The through-passage 82 which extends through the cap 78 can also be seen clearly in this side view. The plates 58 engage through this through-passage 82, with the result that when pivoting the actuating lever 22 up and down, no conflict arises between the cap 78 and the plates 58.

FIG. 7 shows a plan view of the mounting element 54 with the cutouts 94 for the mounting pins 90 which are fastened to the mounting element 54. The through-passage 82 of the cap 78, not shown in FIG. 7, is in alignment, in the mounted state, with a recess 96 in the mounting element 54. The recess 96 allows the actuating lever 22 to be pivoted up and down. The plates 58 are mounted on the mounting pins 90.

FIG. 8 shows a longitudinal section along the line VIII-VIII from FIG. 7 through the mounting element 54. Along the circumferential direction of the mounting element 54, on the side opposed to the operator-side end 93, bosses 97 are applied to the mounting element 54 and, on the side facing the operator-side end 93, a small lug 98 is applied to the mounting element 54, which bosses and lug serve for the secure axial mounting of the mounting element 54 on the fitting housing 12. The bosses 97 engage, in the mounted state, in diametrically opposed cutouts on the L-ring 56 and in so doing engage below the bead 57 formed in the fitting housing 12. The lug 98 engages, in the mounted state, in a diametrically opposed, corresponding radial through-passage in the L-ring. By means of this arrangement, the mounting element 54, in the axial direction, is held in the fitting housing 12, see FIG. 2.

Of course, these bosses 97 can also be used for limiting the rotary movement. Furthermore, the mounting element 54 is held in the L-ring 56 by means of the small lug 98 which is mounted on the operator-side end 93 of the mounting element 54. The bosses 97 and the lug 98 are beveled on a side facing the bottom of the mounting element 54 in order to allow a simple snap fitting of the mounting element 54.

Figure 9:
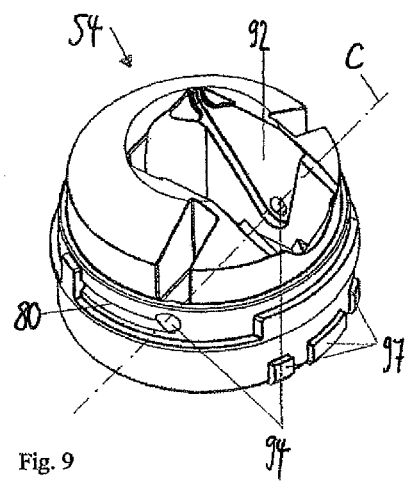
FIG. 9 shows a perspective view of the mounting element with cavities for the reception of plates.

FIG. 9 shows a perspective plan view of the one-piece mounting element 54 with the through-passage 82 and the recesses 92, which are open toward the through-passage 82, for the plates 58. Furthermore, the cutouts 94 for the mounting pins 90 are shown in FIG. 9.

Figure 10:
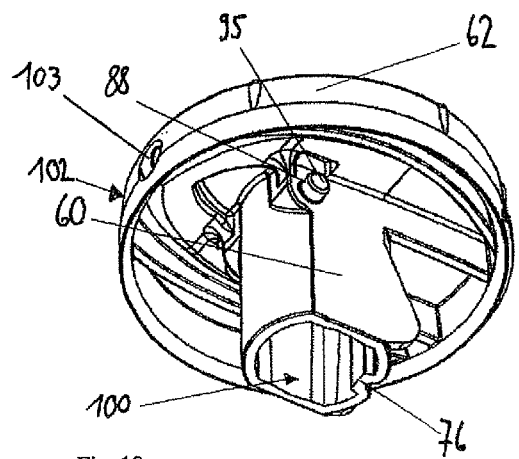
FIG. 10 shows a perspective view obliquely from below of an actuating lever insert with a guide element and stub bolts for the reception of the plates.

FIG. 10 shows a perspective bottom view of the one-piece actuating lever insert 62. The rib 76, which is arranged in a guide recess 100 on the guide element 60, is intended to engage in the groove 74 in the sliding element 59 and thus to act as a means for preventing the rotation of the actuating lever 22. At the upper end of the guide element 60 opposed to the control shank 52, the stub bolts 95 for the plates 58 are integrally formed on said guide element. On a lateral surface of the cap-shaped cover portion 102, the actuating lever insert 62 has a depression 103 in which, in the mounted state, the locking screw 64 engages. In the mounted state, the guide element 60 projects centrally from the cap-shaped cover portion 102 downward in the direction of the control cartridge 36.

Figure 11:
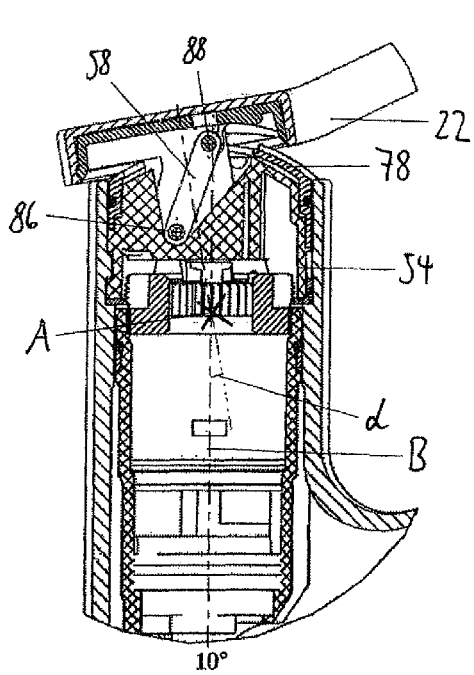
FIG. 11 shows, in an identical representation to FIG. 4, part of the sanitary fitting, with the actuating lever being pivoted up from the closed position through an opening angle of 10°.

FIG. 11 shows the sanitary fitting 10 with the actuating lever 22 which is pivoted up through an opening angle α of 10°. During the movement from the closed position into the open position shown, the plate 58 has moved the actuating lever 22 in the direction away from the control shank 52 and thus prevents a conflict, in a region opposed to the operator-side end 93, between the actuating lever 22 and the fitting housing 12.

Figure 12:
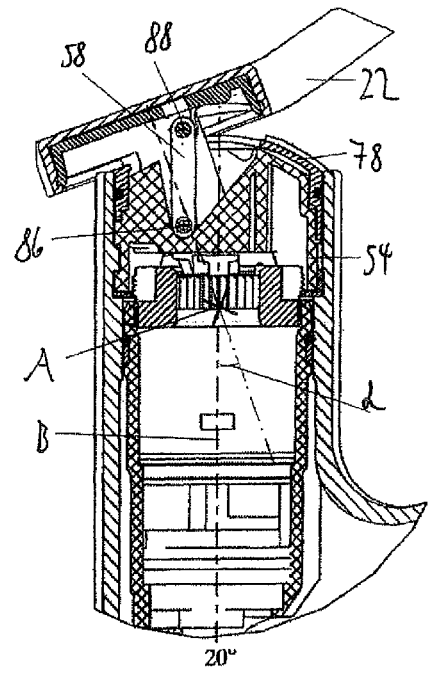
FIG. 12 shows, in an identical representation to FIGS. 4 and 11, part of the sanitary fitting, with the actuating lever being pivoted up from the closed position through an opening angle of 20°.

If the actuating lever 22 is pivoted up further in the direction of the maximum open position, the plate 58, the guide element 60, or the actuating lever 22 moves further in the direction away from the control shank 52. This is shown in FIG. 12. The opening angle α here is 20°. In this open position of the actuating lever 22, the longitudinal direction of the plate 58 is oriented parallel to the cartridge axis B and the actuating lever 22 has, as seen in the direction of the cartridge axis B, the largest spacing from the fitting housing 12. The actuating lever 22 is situated in a zenith in this position. If the actuating lever 22 is pivoted up further in the direction of the open position, this spacing decreases again. The same applies to pivoting the actuating lever 22 down, from the open position shown in FIG. 12 in the direction of the closed position.

If the actuating lever 22 is pivoted up further from the open position shown in FIG. 12, it comes to lie in a maximum open position at an opening angle α of 25°. Here, the plate 58 bears against the recess 92 in the mounting element 54 and a further pivoting-up movement is prevented.

Figure 13:
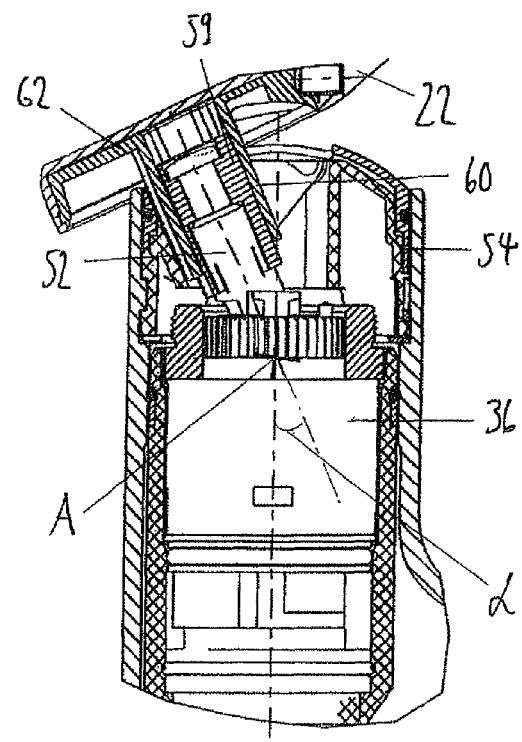
FIG. 13 shows, in an identical representation to FIG. 2, part of the sanitary fitting, with the actuating lever being situated in the maximum open position.
Figure 14:
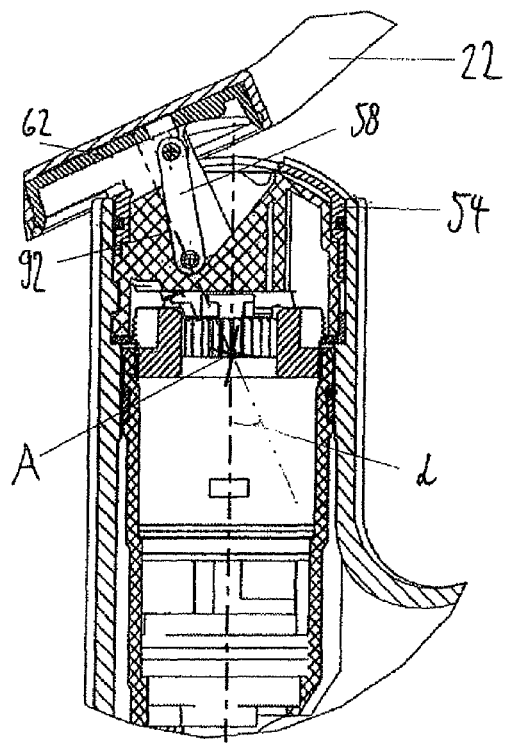
FIG. 14 shows, in an identical representation to FIGS. 4, 11 and 12, part of the sanitary fitting, with the actuating lever likewise being situated in the maximum open position.

FIGS. 13 and 14 show this maximum open position. In this maximum open position, the upper articulation 88 has exceeded the zenith in which the longitudinal direction of the plate 58 extends parallel to the cartridge axis B, and is moved again in the direction toward the control shank 52.

FIG. 13 shows the sanitary fitting 10 in the maximum open position in a longitudinal section along the line II-II from FIG. 3. Owing to the clearly discernible, mutual position of the guide element 60 and sliding element 59, it can be seen very clearly with respect to FIG. 2 that, during the pivoting movement of the actuating lever 22 in the direction of the maximum open position, said lever has been moved away in the direction of the pivot axis A. Conversely, during a pivoting movement of the actuating lever 22 in the direction of the closed position, the actuating lever 22 is moved in the direction toward the pivot axis A.

Thus, a conflict between the fitting housing 12 and the actuating lever 22, in the present case also the actuating lever insert 62, is prevented over the entire pivoting range of the actuating lever 22.

The temperature of the mixed water can be set in a known manner by rotating the actuating lever 22 about the longitudinal direction of the control shank 52, in any pivoting position of the actuating lever 22, without conflict with respect to the fitting housing 12.

It is also conceivable to form the sanitary fitting 10 with only one plate 58. Furthermore, it is possible to select the upper articulation 88 of the plate 58 differently and to form it for example directly on the cap-shaped cover portion 102 of the actuating lever insert 62, or on the actuating lever 22. The latter is of particular advantage if the guide element 60 is arranged directly on the actuating lever 22.

A further alternative of the present invention comprises arranging a plurality of plates 58 in a type of parallelogram and thus achieving the desired movement, during the movement of the actuating lever 22 from the closed position into the open position, in the direction away from the control shank 52, or away from the fitting housing 12. In order to make this possible, the guide element 60 would have to be mounted pivotably on the actuating lever insert 62 or on the actuating lever 22. If the parallelogram is formed by plates 58 of identical length, the actuating lever 22 maintains a position parallel to itself during the movement from the closed position in the direction toward the open position. However, the plates 58 can also be formed with a nonidentical length, which would lead to a superimposed pivoting movement during the movement of the actuating lever 22.

The invention claimed is:

1. A sanitary fitting having a fitting housing, having a control cartridge which is arranged in the latter, which defines a cartridge axis and which has a control shank which can be pivoted about a pivot axis extending at a right angle to the cartridge axis, and having an actuating lever which interacts with the control shank, which has an operator-side end and which can be pivoted up and down between a closed position and an open position in order to pivot the control shank about the pivot axis and thus to control the water flow, wherein a guide element arranged on the actuating lever is displaceably mounted on the control shank, and a plate is mounted at one end on the guide element and at the other end on an axis of rotation which is fixedly arranged with respect to the pivot axis and which is parallel thereto, in order, during the pivoting of the actuating lever from the closed position in the direction toward the open position, to move the actuating lever in the direction away from the control shank and, as seen in the direction of the cartridge axis away from the fitting housing.

2. The sanitary fitting as claimed in claim 1, wherein, in the closed position, the longitudinal direction of the plate forms, as seen in a view in the direction of the pivot axis, an acute angle with the cartridge axis and wherein the axis of rotation, with respect to the cartridge axis, is arranged on a side opposed to the operator-side end.

3. The sanitary fitting as claimed in claim 1, wherein the actuating lever is immovably connected to the guide element.

4. The sanitary fitting as claimed in claim 1, wherein a mounting element is arranged on the fitting housing, preferably such that it can be rotated about the cartridge axis, and wherein the axis of rotation of the plate is defined by the mounting element.

5. The sanitary fitting as claimed in claim 4, wherein a mounting pin which extends coaxially to the axis of rotation for pivotably mounting the plate is arranged on the mounting element.

6. The sanitary fitting as claimed in claim 1, wherein two plates are arranged laterally on the guide element, one on each side, and move in a respective plane parallel to a movement plane of the control shank.

7. The sanitary fitting as claimed in claim 1, wherein, with the longitudinal direction of the plate oriented parallel to the cartridge axis, the actuating lever, as seen in the direction of the cartridge axis, has the largest spacing from the fitting housing.

8. The sanitary fitting as claimed in claim 1, wherein the outer lateral surface of the fitting housing is at least approximately circular cylinder-shaped and the actuating lever, in the closed position, adjoins the circular cylinder-shaped outer lateral surface, with the formation of a gap of constant, preferably very narrow, width running around in the circumferential direction.

9. The sanitary fitting as claimed in claim 1, wherein the control shank together with the actuating lever is mounted such that it can rotate about the cartridge axis.

* * * * *